(12) United States Patent
Asai

(10) Patent No.: US 8,103,954 B2
(45) Date of Patent: *Jan. 24, 2012

(54) PROXY SERVER, AND METHOD AND PROGRAM FOR CONTROLLING SAME

(75) Inventor: Arito Asai, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 252 days.

This patent is subject to a terminal disclaimer.

(21) Appl. No.: 12/552,600

(22) Filed: Sep. 2, 2009

(65) Prior Publication Data

US 2010/0083078 A1 Apr. 1, 2010

(30) Foreign Application Priority Data

Sep. 29, 2008 (JP) ................................. 2008-249818

(51) Int. Cl.
*G06F 17/00* (2006.01)
*G06F 15/16* (2006.01)

(52) U.S. Cl. ........ 715/234; 715/205; 715/208; 715/239; 715/744; 709/217; 709/224

(58) Field of Classification Search .................. 715/200, 715/201, 202, 234, 249, 250, 255, 273, 760, 715/761, 203–205, 207, 208, 210, 226, 231, 715/239, 700, 731, 744–747
See application file for complete search history.

(56) References Cited

U.S. PATENT DOCUMENTS

| 6,480,901 | B1 * | 11/2002 | Weber et al. | 709/246 |
| 7,287,094 | B2 * | 10/2007 | Mogul | 709/246 |
| 7,409,439 | B2 * | 8/2008 | Raja et al. | 709/220 |
| 2002/0052889 | A1 * | 5/2002 | Shinoda | 707/500 |
| 2003/0018753 | A1 * | 1/2003 | Seki | 709/219 |
| 2004/0221063 | A1 * | 11/2004 | Mogul | 709/246 |

FOREIGN PATENT DOCUMENTS

JP 2003-141002 A 5/2003

* cited by examiner

*Primary Examiner* — Maikhanh Nguyen
(74) *Attorney, Agent, or Firm* — Birch, Stewart, Kolasch & Birch, LLP

(57) ABSTRACT

It is so arranged that a cookie can be utilized even by a client terminal that does not support cookie information. An index.html file to which cookie information has been appended is transmitted from a web server to a proxy server. A link destination URL contained in a web page represented by the index.html file is changed by the proxy server and the cookie information is stored in the proxy server. The web page in which the changed URL has been embedded is displayed on the client terminal. If the proxy server is requested for the web page of the changed URL, the proxy server restores the URL to the URL that prevailed before the change and also reads the cookie information. The proxy server then requests the web server for both the web page of the URL that prevailed before the change and the cookie information. Thus the web server can utilize the cookie information even though the client terminal cannot.

3 Claims, 7 Drawing Sheets

Fig. 6A

CONVERSION/REVERSE-CONVERSION TABLE

| LINK DESTINATION URL AFTER CONVERSION | LINK DESTINATION URL BEFORE CONVERSION | LINK SOURCE URL | CLIENT IDENTIFICATION DATA | ACCESS TIME |
|---|---|---|---|---|
| xa.html | pagea.html | index.html | USER A | 2007:02:26:20:35:35 |
| x1.html | page1.html | pagea.html | USER A | 2007:02:26:20:36:10 |
| ...... | ...... | ...... | ...... | ...... |

Fig. 6B

COOKIE INFORMATION TABLE

| CLIENT IDENTIFICATION DATA | COOKIE INFORMATION |
|---|---|
| USER A | COOKIE A1 |
| USER B | COOKIE B1 |
| .. | .. |

PROXY SERVER, AND METHOD AND PROGRAM FOR CONTROLLING SAME

CROSS-REFERENCE TO RELATED APPLICATIONS

This application relates to commonly assigned U.S. patent application Ser. No. 12/139,200 filed on Jun. 13, 2008 and now U.S. Pat. No. 7,783,751.

BACKGROUND OF THE INVENTION

1. Field of the Invention

This invention relates to a proxy server, a method of controlling the proxy server and a program for controlling the proxy server.

2. Description of the Related Art

It has become possible not only for computers but also for mobile telephones to access web servers. Unlike a computer, however, a mobile telephone has various limitations in terms of functionality. For example, there is a limitation upon URL lengths that a mobile telephone can handle. In order to overcome such limitation, there is a technique that enables a web server to be accessed irrespective of this limitation (see the specification of Japanese Patent Application Laid-Open No. 2003-141002).

There are instances where a cookie is utilized when a client computer accesses a web server via the Internet. A cookie is a piece of data written to the client computer temporarily by the web site provider. Although a cookie can be utilized if the device that has accessed the web server is a computer, it cannot be utilized in a case where the device that has accessed the web server is a mobile telephone.

SUMMARY OF THE INVENTION

An object of the present invention is to enable utilization of a cookie.

According to the present invention, the foregoing object is attained by providing a proxy server constituting a communication system having a client terminal, the proxy server and a web server, the proxy server comprising: a web page data receiving device (web page data receiving means) for receiving web page data transmitted from the web server and to which cookie information has been appended, based upon a request from the client terminal; a link destination URL converting device (link destination URL converting means) for converting a link destination URL linking to a second web page, which URL is contained in a first web page represented by the web page data received by the web page data receiving device, in such a manner that the link destination URL becomes a URL that differs for every conversion; a web page data transmitting device (web page data transmitting means) for transmitting web page data, which represents the first web page containing the link destination URL obtained as a result of the conversion by the link destination URL converting device, to the client terminal; a first storage control device (first storage control means) for controlling a first storage device in such a manner that the link destination URL obtained as a result of the conversion by the link destination URL converting device and client identification data generated based upon the request from the client terminal are stored in correspondence with each other; a second storage control device (second storage control means) for controlling a second storage device in such a manner that the client identification data and cookie information, which has been appended to the web page data received by the web page data receiving device and which is updated every time it is received, are stored in correspondence with each other; an URL reverse-converting device for restoring the link destination URL linking to the second web page to the link destination URL that prevailed before the conversion by the link destination URL converting device, in accordance with a request for the second web page specified by the link destination URL contained in the first web page, this request being transmitted from the client terminal in response to transmission thereto of the web page data by the web page data transmitting device, and for finding client identification data that has been stored in the first storage device in correspondence with the URL that was obtained as a result of the conversion by the link destination URL converting device; a cookie information detecting device (cookie information detecting means) for finding cookie information, which has been stored in the second storage device, from the client identification data found by the URL reverse-converting device; and a request-data transmitting device (request-data transmitting means) for transmitting request data, which requests the second web page specified by the URL obtained as a result of the reverse conversion by the URL reverse-converting device, to the web server upon appending the cookie information found by the cookie information detecting device.

The present invention also provides a control method suited to the above-described proxy server. Specifically, the present invention provides a method of controlling a proxy server constituting a communication system having a client terminal, the proxy server and a web server, the method comprising the steps of: receiving web page data transmitted from the web server and to which cookie information has been appended, based upon a request from the client terminal; converting a link destination URL linking to a second web page, which URL is contained in a first web page represented by the received web page data, in such a manner that the link destination URL becomes a URL that differs for every conversion; transmitting web page data, which represents the first web page containing the link destination URL obtained as a result of the conversion, to the client terminal; controlling a first storage device in such a manner that the link destination URL obtained as a result of the conversion and client identification data generated based upon the request from the client terminal are stored in correspondence with each other; controlling a second storage device in such a manner that the client identification data and cookie information, which has been appended to the received web page data and which is updated every time it is received, are stored in correspondence with each other; restoring the link destination URL linking to the second web page to the link destination URL that prevailed before the conversion, in accordance with a request for the second web page specified by the link destination URL contained in the first web page, this request being transmitted from the client terminal in response to transmission of the web page data, and for finding client identification data that has been stored in the first storage device in correspondence with the URL that was obtained as a result of the conversion; finding cookie information, which has been stored in the second storage device, from the found client identification data; and transmitting request data, which requests the second web page specified by the URL restored as a result of the reverse conversion, to the web server upon appending the found cookie information.

The present invention also provides a program for controlling the above-described proxy server. Further, a recording medium storing this program is provided.

In accordance with the present invention, a proxy server is provided between a client terminal and a web server. On the basis of a request from the client terminal, web page data with appended cookie information is transmitted from the web server to the proxy server and the web page data is received by the proxy server. A first web page represented by the received web page data contains a link destination URL that links to a second web page. The link destination URL is converted so as to become a URL that differs for every conversion. The web page data representing the first web page containing the link destination URL obtained as a result of the conversion is transmitted from the proxy server to the client terminal. Further, the link destination URL obtained as a result of the conversion and client identification data, which has been generated based upon the request from the client terminal, are stored in a first storage device. Further, the client identification data and cookie information are stored in a second storage device (the first and second storage devices may just as well be the same device). When the web page data is received by the client terminal, the second web page specified by the link destination URL contained in the first web page represented by this web page data is requested. In accordance with this request, the link destination URL linking to the second web page is restored in the proxy server to the URL that prevailed before the conversion, and client identification data that has been stored in correspondence with the URL that was obtained by the conversion is found from the first storage device. Furthermore, cookie information that has been stored in the second storage device is found from the client identification data that has been found. Request data requesting the second web page specified by the restored URL is transmitted to the web server upon having the found cookie information appended thereto.

In accordance with the present invention, cookie information transmitted from the web server is stored in the proxy server. When the client terminal issues a request to the proxy server, the cookie information is appended to this request data by the proxy server and the request data is then transmitted from the proxy server to the web server. Thus a cookie can be utilized at the web server even in a case where the client terminal cannot utilize cookies.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6A illustrates an example of a conversion/reverse-conversion table, and FIG. 6B illustrates an example of cookie information table;

DESCRIPTION OF THE PREFERRED EMBODIMENT

A preferred embodiment of the present invention will be described in detail with reference to the drawings.

Figure 1:
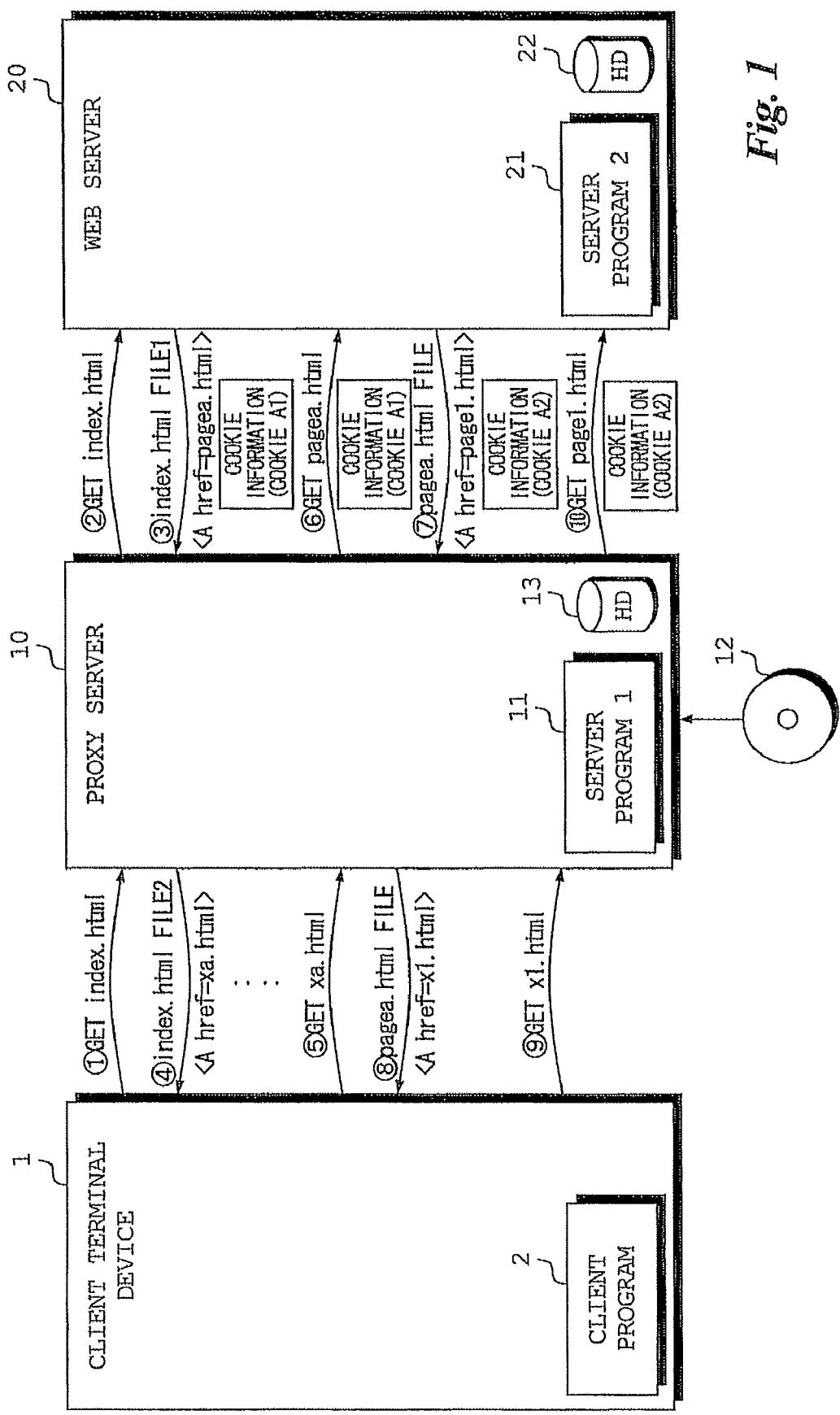
FIG. 1 illustrates the overall configuration of a communication system.

FIG. 1 is a diagram illustrating the overall configuration of a communication system according to an embodiment of the present invention.

The communication system according to this embodiment includes a client terminal 1 typified by a mobile telephone (although it goes without saying that the device is not limited to a mobile telephone), a proxy server 10 and a web server 20.

A client program 2 for controlling operation, described later, has been installed in the client terminal 1. The client terminal 1 includes a CPU, a display unit for displaying a web page, a communication unit for communicating with the proxy server 10, a keypad for applying various commands and a memory, etc., although none of these are illustrated.

A first server program 11 for controlling operation, described later, has been installed in the proxy server 10. The server program 11, which has been stored on a CD-ROM (compact-disk-read-only memory), is read by a CD-ROM drive (not shown) and installed in the proxy server 10. Naturally, it may be so arranged that the server program 11 transmitted from another server or the like is received and installed in the proxy server 10. The proxy server 10 further includes a hard disk 13 for storing a conversion/reverse-conversion table, described later, and other data.

A second server program 21 for controlling operation, described later, has been installed in the web server 20. The web server 20 further includes a hard disk 22. Data such as data of a web page displayed on the display unit of the client terminal 1 has been stored on the hard disk 22.

Both the proxy server 10 and the web server 20 also include a CPU, a display unit, a communication unit, a memory, a hard-disk drive and a keyboard, etc.

When a web page represented by desired web page data that has been stored in the web server 20 is displayed on the display unit of the client terminal 1, the client terminal 1 and the proxy server 10 are connected and the proxy server 10 and the web server 20 are connected.

Figure 2:
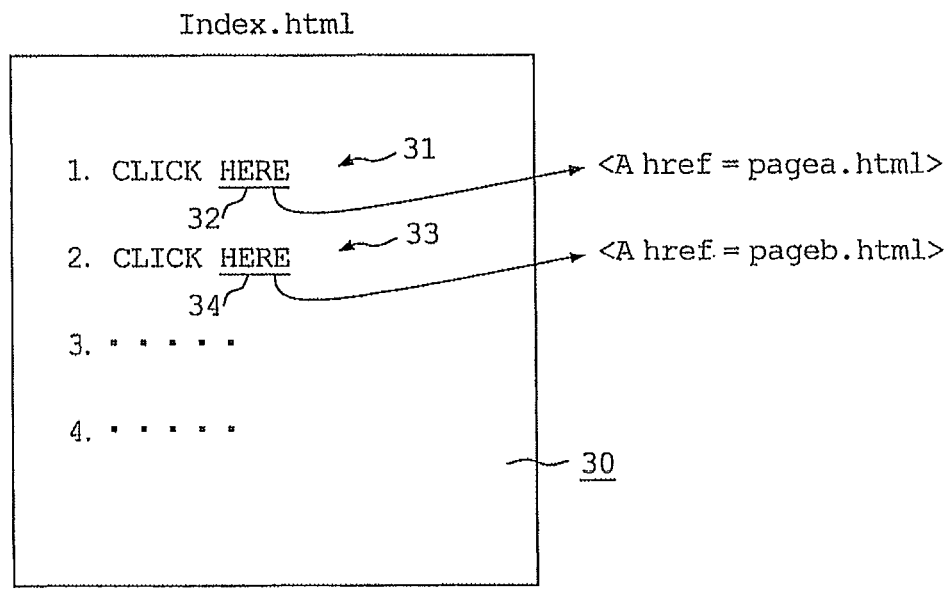
FIGS. 2 and 3 illustrate examples of web pages in which link destination URLs have been embedded.

FIG. 2 illustrates an example of a web page 30 having the URL "index.html".

The web page 30, which has the URL "index.html", contains a first character string 31 reading "CLICK HERE" and a second character string 33 reading "CLICK HERE". The character string "HERE" in the first character string 31 is clickable and constitutes hot text 32. The hot text 32 is linked to a web page having an URL "pagea.html". The character string "HERE" in the second character string 33 is clickable and constitutes hot text 34. The hot text 34 is linked to a web page having an URL "pageb.html".

Figure 3:
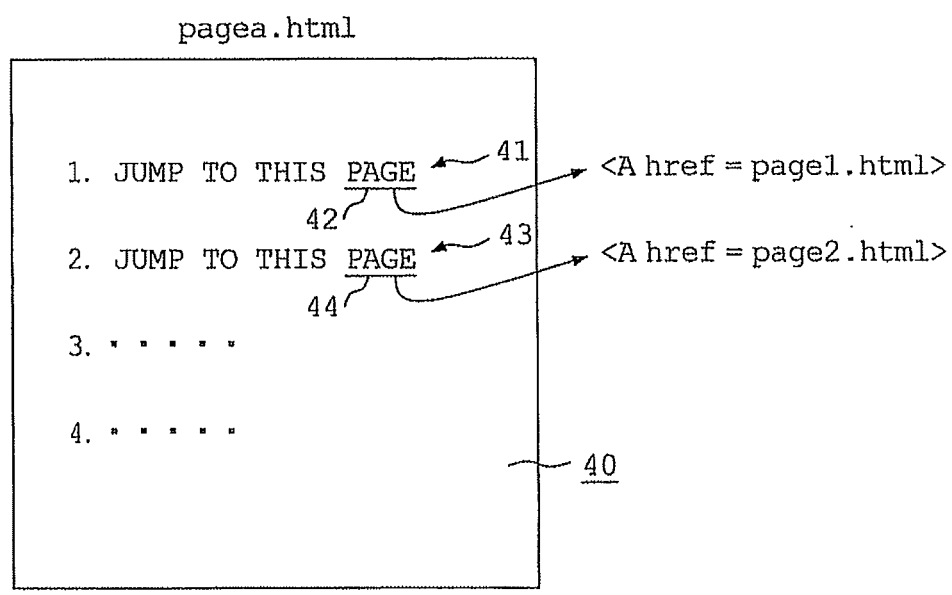

FIG. 3 illustrates an example of the web page having the URL "pagea.html".

Web page 40, which has the URL "pagea.html", contains a first character string 41 reading "JUMP TO THIS PAGE" and a second character string 43 reading "JUMP TO THIS PAGE". The character string "PAGE" in the first character string 41 is hot text 42. The hot text 42 is linked to a web page having an URL "page1.html". The character string "PAGE" in the second character string 43 is hot text 44. The hot text 44 is linked to a web page having an URL "page2.html".

If the hot text 32 is clicked in a case where the web page 30 having the URL "index.html" shown in FIG. 2 is being displayed, the web page 40 having the URL "pagea.html", which is the link destination of the hot text 32, is displayed.

Figure 4:
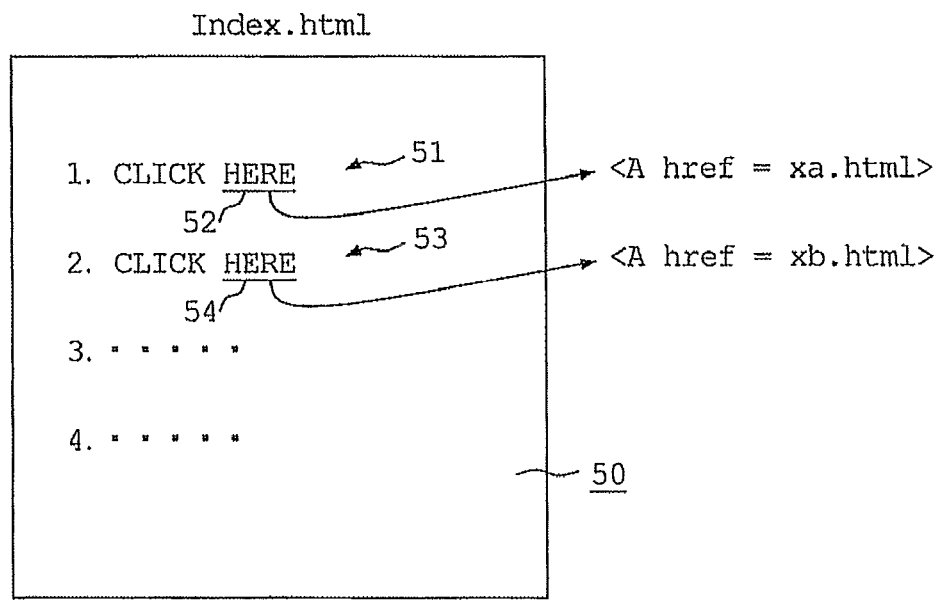
FIGS. 4 and 5 illustrate examples of web pages in which converted link destination URLs have been embedded.

In this embodiment, a web page 50 shown in FIG. 4 is displayed on the client terminal 1 if the web page 30 shown in FIG. 2 is requested at the client terminal 1.

FIG. 4 illustrates an example of the web page 50 having the URL "index.html".

In a manner similar to the web page 30 shown in FIG. 2, the web page 50 contains a first character string 51 reading "CLICK HERE" and a second character string 53 reading "CLICK HERE". The character string "HERE" in the first character string 51 is clickable and constitutes hot text 52. The hot text 52 is linked to a web page having an URL "xa.html", which is different from the web page having the URL "pagea.html" that is the link destination of the hot text 32 shown in FIG. 2. The character string "HERE" in the second character string 53 is clickable and constitutes hot text 54. The hot text 54 is linked to a web page having an URL "xb.html", which is different from the web page having the URL "pageb.html" that is the link destination of the hot text 34 shown in FIG. 2.

In this embodiment of the present invention, as shown in FIG. 1, if the client terminal 1 requests the web page having the URL "index.html" shown in FIG. 2, then the client terminal 1 sends the proxy server 10 a request "GET index.html". If the URL (index.html) contained in the request has not been converted in the proxy server 10, then the request "GET index.html" is transmitted from the proxy server 10 to the web server 20. In accordance with this request, the web server 20 transmits web page data (index.html file 1), which is for displaying the web page having the URL "index.html" shown in FIG. 2, to the proxy server 10. Cookie information (cookie A1) has been appended to this web page data. (The setup is such that the cookie information is created in the proxy server 10.) When the proxy server 10 receives the web page data transmitted from the web server 20, the URLs which are the link destinations of the hot text are converted in the proxy server 10 so as to become URLs that differ for every conversion in such a manner that the data representing the web page 50 shown in FIG. 4 is obtained from the web page 30 shown in FIG. 2. More specifically, the link destination is converted from "pagea.html" shown in FIG. 2 to "xa.html" shown in FIG. 4, and from "pageb.html" shown in FIG. 2 to "xb.html" shown in FIG. 4. Web page data (index.html file 2), in which the URLs of the link destinations have been converted, is transmitted from the proxy server 10 to the client terminal 1. Further, the cookie information that has been appended to the web page data also is stored in the proxy server 10. It does not matter whether this cookie information is or is not transmitted to the client terminal 1.

When the web page 50 shown in FIG. 4 is displayed on the display unit of the client terminal 1, the user of the client terminal 1 clicks either of the hot text items being displayed on the web page 50. If the hot text 52 is clicked by the user, then the request "GET xa.html" for the web page of "xa.html", which is the link destination of the hot text 52, is sent from the client terminal 1 to the proxy server 10.

When the request "GET xa.html" for the web page having the URL "xa.html" is received by the proxy server 10, the URL (xa.html) of the requested web page, since it is the result of conversion by the proxy server 10, is restored to the original URL (pagea.html) that prevailed before the conversion. Further, client identification data is stored in correspondence with the converted URL and the cookie information is stored in correspondence with the client identification data. If the converted URL is known, therefore, the cookie information that has been stored can be ascertained and the cookie information can be read. The request "GET pagea.html" for the web page having the restored original URL (pagea.html) is transmitted from the proxy server 10 to the web server 20 upon not having the cookie information appended thereto.

In the web server 20, the cookie information has been appended to the request "GET pagea.html" for the web page having the URL "pagea.html" transmitted from the proxy server 10. Thus, even if the client terminal 1 is one such as a mobile telephone that cannot utilize cookie information, the web server 20 becomes capable of utilizing the cookie information. Further, when the request "GET pagea.html" for the web page having the URL "pagea.html" transmitted from the proxy server 10 is received by the web server 20, the latter responds to the request by sending the proxy server 10 the web page data (page.html file) representing the web page having the URL "pagea.html", this web page data having cookie information (cookie A2) appended thereto, as illustrated in FIG. 3.

Figure 5:
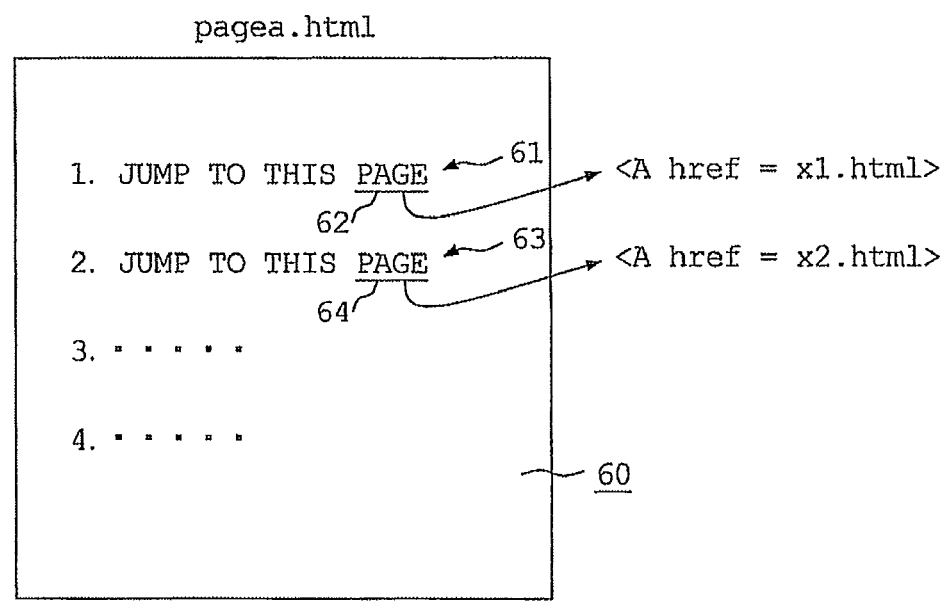

Processing for URL conversion is executed in the proxy server 10 in such a manner that a web page 60 shown in FIG. 5 is displayed from the web page 40 shown in FIG. 3. Further, the cookie information (cookie A2) that has been appended to the web page data is stored in memory.

In FIG. 5, in a manner similar to FIG. 3, the web page 60 having the URL "pagea.html" contains a first character string 61 reading "JUMP TO THIS PAGE" and a second character string 63 reading "JUMP TO THIS PAGE". The character string "PAGE" in the first character string 61 is hot text 62. The hot text 62 is linked to a web page having an URL "x1.html" and not to the web page having the URL "page1.html" as in the case of the hot text 52 shown in FIG. 3. The character string "PAGE" in the second character string 63 is hot text 64. The hot text 64 is linked to a web page having an URL "x2.html" and not to the web page having the URL "page2.html" as in the case of the hot text 44 shown in FIG. 3.

Conversion of the link destination URLS contained in the web page is performed by the proxy server 10 in such a manner that the web page 60 shown in FIG. 5 is displayed from the web page 40 shown in FIG. 3. By transmitting the web page data (pagea.html file) in which the link destination URLs have been converted from the proxy server 10 to the client terminal 1, the web page 60 shown in FIG. 5 is displayed on the display screen of the display unit of client terminal 1.

Thereafter, in a manner similar to that described above, the URL of a web page requested (by request GET x1.html) from the client terminal 1 is reverse-converted in the proxy server 10 and the cookie information (cookie A2) is read by the proxy server. The request (GET page1.html) for the web page to which the read cookie information (cookie A2) has been appended and having the URL that prevailed before the conversion is applied to the web server 20, as a result of which the web server 20 transmits the web page data to the client terminal 1 via the proxy server 10.

FIG. 6A illustrates an example of a conversion/reverse-conversion table, and FIG. 6B shows an example of a cookie information table.

The conversion/reverse-conversion table and cookie information table in FIGS. 6A and 6B are stored on the hard disk 13 of the proxy server 10.

As shown in FIG. 6A, link destination URLs after conversion, link destination URLs before conversion, link source URLS, client identification data and access times are recorded in the conversion/reverse-conversion table, as mentioned above. The link source URLs are the URLs of the web pages 30 to 60 to which the link destinations have been linked by the hot text 32, 34, 42, 44, 52, 54, 62 and 64, as illustrated in FIGS. 2 to 5. The client identification data is generated in order to identify the client terminal 1 in a case where the URL of a web page requested from the client terminal 1 has not been converted in the proxy server 10, i.e., in a case where a web page request is issued from the client terminal 1 to the proxy server 10 the first time. As for access times, if reverse conversion of an URL has been performed, the access time is recorded as an indication of access to the web page having the reverse-converted URL.

In FIG. 6B, cookie information that has been transmitted from the web server 20 is stored in the cookie information table in correspondence with the client identification data. The cookie information is updated (overwritten) for every item of client identification data. The latest cookie information is stored in the cookie information table.

Which web page has been accessed by the client terminal identified by the client identification data can be determined from the history of the link source URLs in the conversion/reverse-conversion table. In particular, in this embodiment, since the cookie information has been stored in the cookie information table in correspondence with the client identification data, the cookie information can be found from the client identification data. Thus, when a request transmitted from the client terminal 1 is sent to the web server 20, the cookie information that has been found is appended to the request and therefore the web server 20 is capable of utilizing the cookie information even if the client terminal 1 cannot do so.

Figure 7:
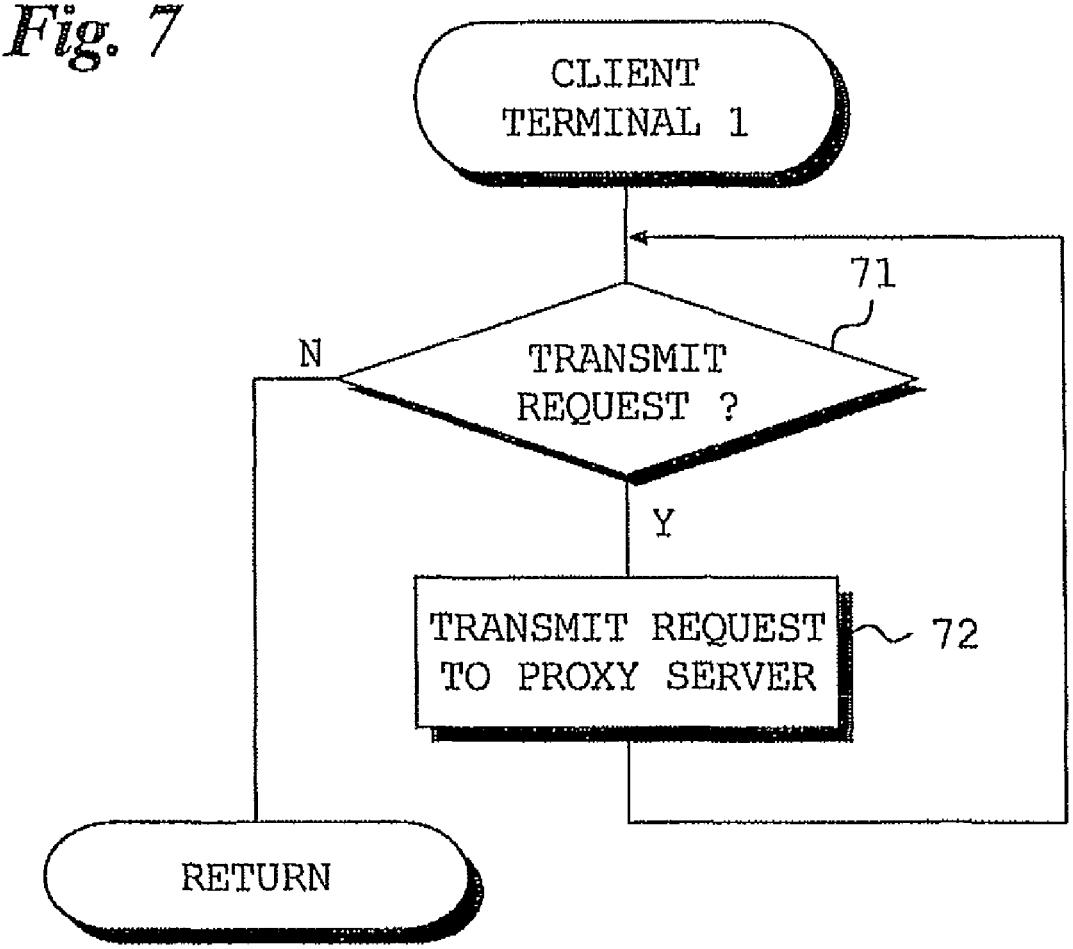
FIG. 7 is a flowchart illustrating processing executed by a client terminal.
Figure 8:
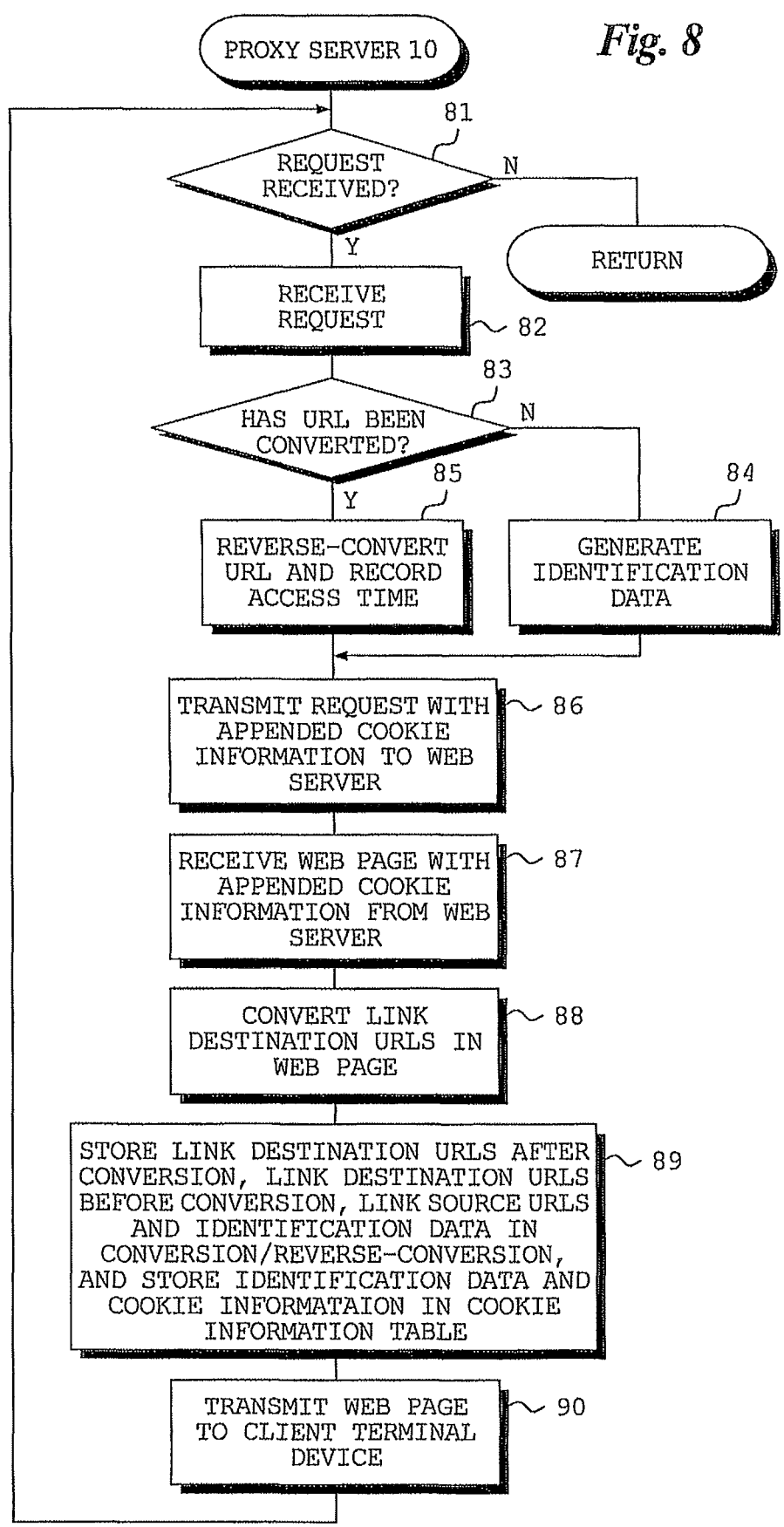
FIG. 8 is a flowchart illustrating processing executed by a proxy server.
Figure 9:
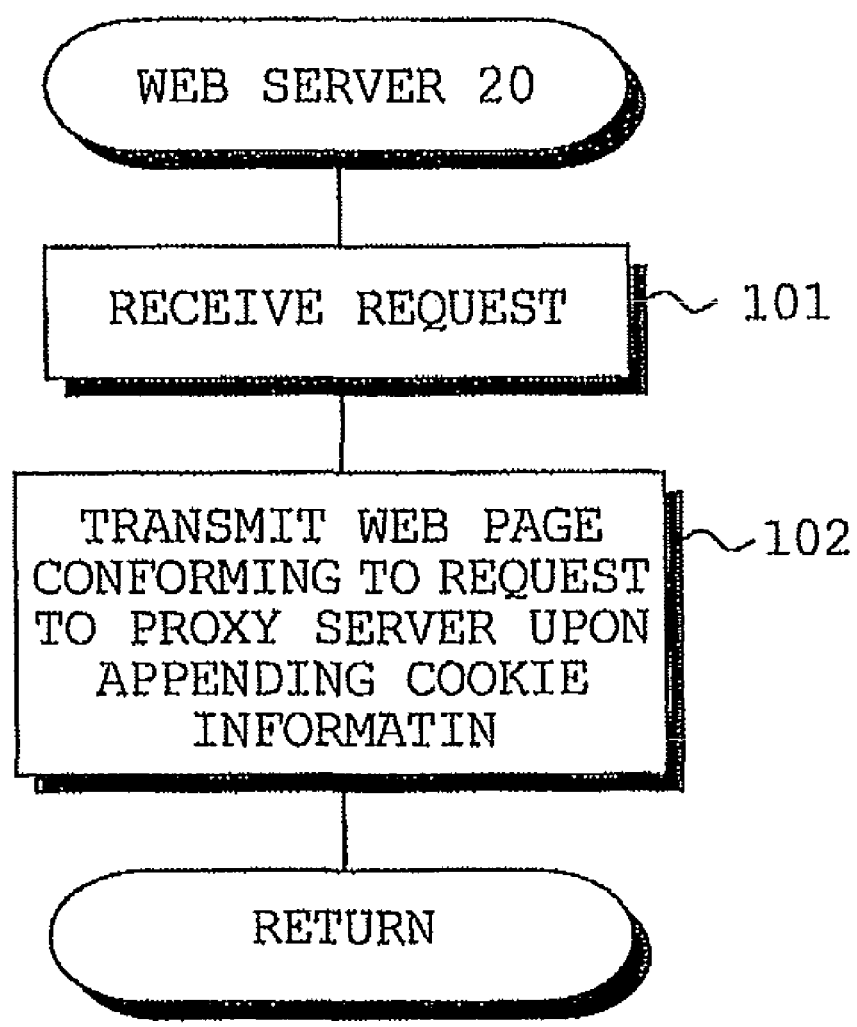
FIG. 9 is a flowchart illustrating processing executed by a web server.

FIG. 7 to 9 are flowcharts illustrating processing executed among the client terminal 1, proxy server 10 and web server 20. FIG. 7 illustrates the processing executed by the client terminal 1, FIG. 8 the processing executed by the proxy server 10 and FIG. 9 the processing executed by the web server 20.

First, the client terminal 1 sends the proxy server 10 a request for a web page specified by the URL of the web page ("YES" at step 71 in FIG. 7; step 72 in FIG. 7).

When the request transmitted from the client terminal 1 is received by the proxy server 10 (steps 81 and 82 in FIG. 8), it is determined whether the URL of the web page specified by the received request is one that has been converted in the proxy server 10 (step 83 in FIG. 8).

If the request for the web page has been transmitted to the proxy server 10 for the first time, then the URL of the web page specified by this request is one that has not been converted in the proxy server 10 ("NO" at step 83 in FIG. 8). Therefore, identification data specific to the client terminal 1 that transmitted the request is generated by the proxy server 10 (step 84 in FIG. 8). The request received is transmitted from the proxy server 10 to the web server 20 (step 86 in FIG. 8).

The request transmitted from the proxy server 10 is received by the web server 20 (step 101 in FIG. 9), whereupon data representing the web page having the URL specified by this request and to which cookie information has been appended is transmitted from the web server 20 to the proxy server 10 (step 102 in FIG. 9).

When the web page data with the appended cookie information transmitted from the web server 20 is received by the proxy server 10 (step 87 in FIG. 8), the link destination URLs that have been embedded in the hot text contained in the web page represented by the received web page data are converted so as to become URLs that differ for every conversion (step 88 in FIG. 8). Further, the cookie information that has been appended to the web page data is read. The URLs after the conversion, the URLS before the conversion, the link source URLs (the URLs of the web pages), and the client identification data are recorded in the conversion/reverse-conversion table, and the client identification data and the cookie information are recorded in the cookie information table. The cookie information is recorded while being updated in such a manner that the latest cookie information will be recorded (step 89 in FIG. 8). The web page data in which the link destination URLs have been converted is transmitted from the proxy server 10 to the client terminal 1 (step 90 in FIG. 8).

When the web page data transmitted from the proxy server 10 is received by the client terminal 1, hot text contained in the web page represented by the received web page data is clicked. When this is done, a request for the web page having the link destination URL embedded in this hot text is transmitted from the client terminal 1 to the proxy server 10 ("YES" at step 71 in FIG. 7; step 72 in FIG. 7).

When the request transmitted from the client terminal 1 is received by the proxy server 10 (steps 81, 82 in FIG. 8), it is determined whether the URL specified by this request is an URL that has been converted (step 83). In this case, the URL is one that has been converted ("YES" at step 83 in FIG. 8) and therefore the URL is restored to the URL before the conversion by referring to the conversion/reverse-conversion table (step 85 in FIG. 8). Further, the access time is recorded in the conversion/reverse-conversion table (step 85 in FIG. 8). Furthermore, the client identification data that has been stored in the conversion/reverse-conversion table in correspondence with the URL that was converted (the URL that prevailed before the conversion) is read. The cookie information that has been recorded in the cookie information table is read from the client identification data that has been read. The request for the web page specified by the reverse-converted URL, which request has the read cookie information appended thereto, is transmitted from the proxy server 10 to the web server 20 (step 86 in FIG. 8), whereby data representing the web page having the reverse-converted URL is transmitted from the web server 20 to the proxy server 10 (step 72 in FIG. 7). Link destination URLs that have been embedded in the web page are converted in the proxy server 10 (step 88 in FIG. 8). The converted link destination URLs, etc., are recorded in the conversion/reverse-conversion table (step 89 in FIG. 8). The web page data in which the link destination URLs have been converted is transmitted from the proxy server 10 to the client terminal 1 (step 90 in FIG. 8). Processing is subsequently repeated in similar fashion when a request is sent from the client terminal 1 to the proxy server 10.

As many apparently widely different embodiments of the present invention can be made without departing from the spirit and scope thereof, it is to be understood that the invention is not limited to the specific embodiments thereof except as defined in the appended claims.

What is claimed is:

1. A proxy server constituting a communication system having a client terminal, the proxy server and a web server, said proxy server comprising:

a web page data receiving device for receiving web page data transmitted from the web server and to which cookie information has been appended, based upon a request from the client terminal;

a link destination URL converting device for converting a link destination URL linking to a second web page, which URL is contained in a first web page represented by the web page data received by said web page data receiving device, in such a manner that the link destination URL becomes a URL that differs for every conversion;

a web page data transmitting device for transmitting web page data, which represents the first web page containing the link destination URL obtained as a result of the conversion by said link destination URL converting device, to the client terminal;

a first storage control device for controlling a first storage device in such a manner that the link destination URL obtained as a result of the conversion by said link destination URL converting device and client identification data generated based upon the request from the client terminal are stored in correspondence with each other;
a second storage control device for controlling a second storage device in such a manner that the client identification data and cookie information, which has been appended to the web page data received by said web page data receiving device and which is updated every time it is received, are stored in correspondence with each other;
a URL reverse-converting device for restoring the link destination URL linking to the second web page to the link destination URL that prevailed before the conversion by said link destination URL converting device, in accordance with a request for the second web page specified by the link destination URL contained in the first web page, this request being transmitted from the client terminal in response to transmission thereto of the web page data by said web page data transmitting device, and for finding client identification data that has been stored in the first storage device in correspondence with the URL that was obtained as a result of the conversion by said link destination URL converting device;
a cookie information detecting device for finding cookie information, which has been stored in the second storage device, from the client identification data found by said URL reverse-converting device;
a request-data transmitting device for transmitting request data, which requests the second web page specified by the URL restored as a result of the reverse conversion by said URL reverse-converting device, to the web server upon appending the cookie information found by said cookie information detecting device; and
a memory device including at least one of the first storage device and the second storage device.

2. A method of controlling a proxy server constituting a communication system having a client terminal, the proxy server and a web server, the method comprising the steps of:
receiving web page data transmitted from the web server and to which cookie information has been appended, based upon a request from the client terminal;
converting a link destination URL linking to a second web page, which URL is contained in a first web page represented by the received web page data, in such a manner that the link destination URL becomes a URL that differs for every conversion;
transmitting web page data, which represents the first web page containing the link destination URL obtained as a result of the conversion, to the client terminal;
controlling a first storage device in such a manner that the link destination URL obtained as a result of the conversion and client identification data generated based upon the request from the client terminal are stored in correspondence with each other;
controlling a second storage device in such a manner that the client identification data and cookie information, which has been appended to the received web page data and which is updated every time it is received, are stored in correspondence with each other;
restoring the link destination URL linking to the second web page to the link destination URL that prevailed before the conversion, in accordance with a request for the second web page specified by the link destination URL contained in the first web page, this request being transmitted from the client terminal in response to transmission of the web page data, and for finding client identification data that has been stored in the first storage device in correspondence with the URL that was obtained as a result of the conversion;
finding cookie information, which has been stored in the second storage device, from the found client identification data; and
transmitting request data, which requests the second web page specified by the URL restored as a result of the reverse conversion, to the web server upon appending the found cookie information.

3. A non-transitory computer-readable recording medium storing a program for controlling a proxy server constituting a communication system having a client terminal, the proxy server and a web server, said program controlling said proxy server so as to cause said proxy server to:
receive web page data transmitted from the web server and to which cookie information has been appended, based upon a request from the client terminal;
convert a link destination URL linking to a second web page, which URL is contained in a first web page represented by the received web page data, in such a manner that the link destination URL becomes a URL that differs for every conversion;
transmit web page data, which represents the first web page containing the link destination URL obtained as a result of the conversion, to the client terminal;
control a first storage device in such a manner that the link destination URL obtained as a result of the conversion and client identification data generated based upon the request from the client terminal are stored in correspondence with each other;
control a second storage device in such a manner that the client identification data and cookie information, which has been appended to the received web page data and which is updated every time it is received, are stored in correspondence with each other;
in accordance with a request for the second web page specified by the link destination URL contained in the first web page, this request being transmitted from the client terminal in response to transmission of the web page data, restore the link destination URL linking to the second web page to the link destination URL that prevailed before the conversion, and find client identification data that has been stored in the first storage device in correspondence with the URL that was obtained as a result of the conversion;
find cookie information, which has been stored in the second storage device, from the found client identification data; and
transmit request data, which requests the second web page specified by the restored URL, to the web server upon appending the found cookie information.

* * * * *